(12) United States Patent
Song et al.

(10) Patent No.: US 11,774,752 B2
(45) Date of Patent: Oct. 3, 2023

(54) HOLOGRAPHIC DISPLAY DEVICE HAVING REDUCED CHROMATIC ABERRATION

(71) Applicant: SAMSUNG ELECTRONICS CO., LTD., Suwon-si (KR)

(72) Inventors: Hoon Song, Yongin-si (KR); Hongseok Lee, Seoul (KR); Young Kim, Yongin-si (KR); Jungkwuen An, Suwon-si (KR); Kanghee Won, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 17/107,290

(22) Filed: Nov. 30, 2020

(65) Prior Publication Data

US 2021/0080716 A1    Mar. 18, 2021

Related U.S. Application Data

(63) Continuation of application No. 16/233,980, filed on Dec. 27, 2018, now Pat. No. 10,884,240.

(30) Foreign Application Priority Data

Jul. 4, 2018 (KR) .................. 10-2018-0077619

(51) Int. Cl.
  *G02B 27/00* (2006.01)
  *G03H 1/22* (2006.01)
(52) U.S. Cl.
  CPC ....... *G02B 27/0068* (2013.01); *G03H 1/2286* (2013.01); *G03H 2001/221* (2013.01); *G03H 2001/2234* (2013.01); *G03H 2222/18* (2013.01)

(58) Field of Classification Search
  CPC ......... G02B 27/0068; G03H 2001/221; G03H 2001/2234
  See application file for complete search history.

(56) References Cited

U.S. PATENT DOCUMENTS 9,164,206 B2    10/2015   Valley et al.
9,720,246 B2    8/2017    Won et al.
(Continued)

FOREIGN PATENT DOCUMENTS

CN    104298103 A    1/2015
CN    105954992 A    9/2016
(Continued)

OTHER PUBLICATIONS

Yun-Tae Kim et al., "Holographic Augmented Reality Head-Up Display with Eye Tracking and Steering Light Source", The 23rd IDW, Dec. 9, 2016, pp. 1308-1311.
(Continued)

*Primary Examiner* — Wen Huang
(74) *Attorney, Agent, or Firm* — Sughrue Mion, PLLC

(57) ABSTRACT

A holographic display device includes a light source configured to emit light, the light including first light of a first wavelength, second light of a second wavelength, and third light of a third wavelength; a spatial light modulator configured to form a holographic pattern to modulate the light emitted from the light source and to produce a holographic image; and a focusing optical system configured to focus the holographic image. The focusing optical system includes a fixed-focus optical system having a fixed focal length, and a variable focus optical system having a focal length that is changed by electrical control. The fixed-focus optical system is configured to focus the first light of the first wavelength, the second light of the second wavelength, and the third light of the third wavelength on different positions, (Continued)

respectively, on an optical axis to cancel a chromatic aberration by the variable focus optical system.

19 Claims, 14 Drawing Sheets

(56) References Cited

U.S. PATENT DOCUMENTS

| | | |
|---|---|---|
| 10,503,251 B2 | 12/2019 | Shi |
| 10,545,337 B2 | 1/2020 | Sung et al. |
| 2007/0273944 A1 | 11/2007 | Grier et al. |
| 2016/0349702 A1 | 12/2016 | Sung et al. |
| 2017/0200423 A1 | 7/2017 | Kim et al. |
| 2018/0120768 A1 | 5/2018 | Christmas |
| 2018/0129105 A1 | 5/2018 | Kim et al. |
| 2018/0156962 A1 | 6/2018 | Kim et al. |
| 2018/0173057 A1 | 6/2018 | Choi et al. |
| 2018/0181065 A1 | 6/2018 | An et al. |
| 2018/0196271 A1 | 7/2018 | Hong et al. |
| 2019/0278068 A1* | 9/2019 | Hatada ............... G02B 15/1461 |
| 2020/0201253 A1 | 6/2020 | Christmas |
| 2022/0043396 A1 | 2/2022 | An et al. |

FOREIGN PATENT DOCUMENTS

| | | |
|---|---|---|
| CN | 106842568 A | 6/2017 |
| CN | 107422623 A | 12/2017 |
| CN | 107735734 A | 2/2018 |
| JP | 2006-113296 A | 4/2006 |
| KR | 10-2014-0060204 A | 5/2014 |
| KR | 10-2014-0135561 A | 11/2014 |
| KR | 10-2016-0141588 A | 12/2016 |
| KR | 10-1801942 B1 | 11/2017 |
| KR | 10-2018-0006463 A | 1/2018 |
| KR | 10-1824328 B1 | 2/2018 |
| KR | 10-2018-0052356 A | 5/2018 |
| KR | 10-2018-0065421 A | 6/2018 |
| KR | 10-2018-0072356 A | 6/2018 |
| KR | 10-2018-0074154 A | 7/2018 |

OTHER PUBLICATIONS

Communication dated Jun. 24, 2019, issued by the European Patent Office in counterpart European Application No. 19161508.7.
Notice of Allowance issued in parent U.S. Appl. No. 16/233,980 dated Oct. 9, 2020.
Communication dated Jul. 11, 2022 by the China National Intellectual Property Administration in Chinese Patent Application No. 201910122855.4.
Communication dated Dec. 22, 2022, issued by the Korean Intellectual Property Office in Korean Patent Application No. 10-2018-0077619.
Communication dated Jun. 29, 2023, issued by the Korean Intellectual Property Office in Korean Patent Application No. 10-2018-0077619.

* cited by examiner

HOLOGRAPHIC DISPLAY DEVICE HAVING REDUCED CHROMATIC ABERRATION

CROSS-REFERENCE TO RELATED APPLICATION

This is a continuation of U.S. application Ser. No. 16/233,980 filed on Dec. 27, 2018, which claims priority from Korean Patent Application No. 10-2018-0077619, filed on Jul. 4, 2018 in the Korean Intellectual Property Office, the disclosures of which are incorporated herein in their entirety by reference.

BACKGROUND

1. Field

Example embodiments of the present disclosure relate to a holographic display device, and more particularly, to a holographic display device having reduced chromatic aberration.

2. Description of the Related Art

Methods of realizing three-dimensional (3D) images such as glasses-type methods and non-glasses-type methods are widely used. Examples of glasses-type methods include polarizing glasses-type methods and shutter glasses-type methods, and examples of the non-glasses-type methods include lenticular methods and parallax barrier methods. These methods use binocular parallax, and increasing the number of viewpoints is limited. In addition, these methods may make the viewers feel tired due to the difference between the depth perceived by the brain and the depth of focus by the eyes.

Recently, holographic display techniques, which are 3D image display methods capable of matching the depth perceived by the brain to be consistent with the depth of focus by the eyes and providing full parallax, have been gradually put to practical use. According to a holographic display technique, when reference light is radiated onto a holographic pattern having recorded thereon an interference pattern obtained by interference between object light reflected from an original object and the reference light, the reference light is diffracted and an image of the original object is reproduced. When a commercialized holographic display technique is used, a computer-generated hologram (CGH), rather than a holographic pattern obtained by directly exposing an original object to light, is provided as an electric signal to a spatial light modulator. Then, the spatial light modulator forms a holographic pattern and diffracts reference light according to the input CGH signal, thereby generating a 3D image.

SUMMARY

One or more example embodiments provide a holographic display device having reduced chromatic aberration.

Additional aspects will be set forth in part in the description which follows and, in part, will be apparent from the description, or may be learned by practice of example embodiments.

According to an aspect of an example embodiment, there is provided a holographic display device including a light source configured to emit light, the light including first light of a first wavelength, second light of a second wavelength, and third light of a third wavelength, a spatial light modulator configured to form a holographic pattern to modulate the light emitted from the light source and to produce a holographic image, and a focusing optical system configured to focus the holographic image, wherein the focusing optical system includes a fixed-focus optical system having a fixed focal length, and a variable focus optical system having a focal length that is changed by electrical control, wherein the fixed-focus optical system is configured to focus the first light of the first wavelength, the second light of the second wavelength, and the third light of the third wavelength on different positions, respectively, on an optical axis to cancel chromatic aberration by the variable focus optical system.

The holographic display device, wherein each of the fixed-focus optical system and the variable focus optical system may have a positive refractive power.

The fixed-focus optical system may include a first lens set configured to focus the first light of the first wavelength on a first position on the optical axis, a second lens set configured to focus the second light of the second wavelength on a second position on the optical axis that is different from the first position, and a third lens set configured to focus the third light of the third wavelength on a third position on the optical axis that is different from the first position and the second position, respectively.

The holographic display device, wherein a distance between the light source and the first position may be less than a distance between the light source and the second position, the distance between the light source and the second position may be less than a distance between the light source and the third position, the third wavelength may be longer than the second wavelength, and the second wavelength may be longer than the first wavelength.

The holographic display device, wherein a distance between the light source and the first lens set may be less than a distance between the light source and the second lens set, and the distance between the light source and the second lens set may be less than a distance between the light source and the third lens set.

The variable focus optical system may include a variable focus diffractive lens element having a first focal length for the first light of the first wavelength, a second focal length for the second light of the second wavelength, and a third focal length for the third light of the third wavelength, the first focal length may be longer than the second focal length, and the second focal length may be longer than the third focal length.

The first position, the second position, and the third position may be respectively selected to cancel chromatic aberration by the variable focus diffractive lens element to be within a focus adjustment range of the variable focus diffractive lens element.

The first lens set may include a first wavelength-selective polarization conversion element and a first anisotropic diffractive lens element, the second lens set may include a second wavelength-selective polarization conversion element and a second anisotropic diffractive lens element, and the third lens set comprises a third wavelength-selective polarization conversion element and a third anisotropic diffractive lens element.

The first wavelength-selective polarization conversion element, the first anisotropic diffractive lens element, the second wavelength-selective polarization conversion element, the second anisotropic diffractive lens element, the third wavelength-selective polarization conversion element, and the third anisotropic diffractive lens element may be sequentially arranged along the optical axis in a direction away from the light source.

The first wavelength-selective polarization conversion element may be configured to polarize the first light of the first wavelength to have a first linear polarization component and polarize the second light of the second wavelength and the third light of the third wavelength to have a second linear polarization component that is orthogonal to the first linear polarization component, the second wavelength-selective polarization conversion element may be configured to polarize the second light of the second wavelength to have the first linear polarization component and the first light of the first wavelength and the third light of the third wavelength to have the second linear polarization component, and the third wavelength-selective polarization conversion element may be configured to polarize the third light of the third wavelength to have the first linear polarization component and the first light of the first wavelength and the second light of the second wavelength to have the second linear polarization component.

The holographic display device, wherein each of first anisotropic diffractive lens element, the second anisotropic diffractive lens element, and the third anisotropic diffractive lens element, respectively, may be configured to focus light of the first linear polarization component and transmit light of the second linear polarization component without diffraction.

The fixed-focus optical system may further include a fourth wavelength-selective polarization conversion element configured to polarize the first light of the first wavelength, the second light of the second wavelength and the third light of the third wavelength, respectively, to have a same linear polarization component.

The first wavelength-selective polarization conversion element may be configured to polarize the first light of the first wavelength to have a first circular polarization component and to polarize the second light of the second wavelength and the third light of the third wavelength to have a second circular polarization component that is opposite to the first circular polarization component, the second wavelength-selective polarization conversion element may be configured to polarize the second light of the second wavelength to have the first circular polarization component and the first light of the first wavelength and the third light of the third wavelength to have the second circular polarization component, and the third wavelength-selective polarization conversion element may be configured to polarize the third light of the third wavelength to have the first circular polarization component and the first light of the first wavelength and the second light of the second wavelength to have the second circular polarization component.

The holographic display device, wherein each of the first anisotropic diffractive lens element, the second anisotropic diffractive lens element, and the third anisotropic diffractive lens element, respectively, may be configured to focus light of the first circular polarization component and transmit light of the second circular polarization component without diffraction.

The fixed-focus optical system may further include a fourth wavelength-selective polarization conversion element configured to polarize the first light of the first wavelength, the second light of the second wavelength, and the third light of the third wavelength to have an identical circular polarization component.

The fixed-focus optical system may have a positive refractive power and the variable focus optical system may have a negative refractive power.

The fixed-focus optical system may include a fixed-focus diffractive lens element having a first focal length for the first light of the first wavelength, a second focal length for the second light of the second wavelength, and a third focal length for the third light of the third wavelength, the first focal length may be longer than the second focal length, and the second focal length may be longer than the third focal length.

The variable focus optical system may include a variable focus diffractive lens element, wherein chromatic aberration by the variable focus diffractive lens element is opposite to chromatic aberration by the fixed-focus diffractive lens element, and the chromatic aberration by the variable focus diffractive lens element is selected to cancel the chromatic aberration by the fixed-focus diffractive lens element in a focus adjustment range of the variable focus diffractive lens element.

The holographic display device may further include an eye tracker configured to track a pupil position of an observer.

The light source may include a first light source configured to generate a first holographic image corresponding to a first view point and a second light source configured to generate a second holographic image corresponding to a second view point that is different from the first view point.

The holographic display device may further include an actuator configured to adjust positions of the first light source and the second light source based on the pupil position of the observer that is tracked by the eye tracker.

The holographic display device may further include an illumination optical system configured to transmit light emitted from the light source to the spatial light modulator.

The illumination optical system comprises a light guide plate may include an input coupler and an output coupler, and a beam deflector configured to transmit the light emitted from the light source to the input coupler, and wherein the beam deflector may be configured to adjust an incident angle of the light incident on the input coupler based on the pupil position of the observer tracked by the eye tracker.

The holographic display device, wherein a distance between the first position and the second position may be equal to a difference between the first focal length and the second focal length, and a distance between the second position and the third position may be equal to a difference between the second focal length and the third focal length.

According to an aspect of an example embodiment, there is provided a holographic display device including a light source configured to emit light, the light comprising first light of a first wavelength, second light of a second wavelength, and third light of a third wavelength, a spatial light modulator configured to form a holographic pattern to modulate the light emitted from the light source and to produce a holographic image, and a focusing optical system configured to focus the holographic image, wherein the focusing optical system includes a fixed-focus optical system having a fixed focal length, and a variable focus optical system having a first focal length for the first light of the first wavelength, a second focal length for the second light of the second wavelength, and a third focal length for the third light of the third wavelength, wherein the fixed-focus optical system is configured to focus the first light of the first wavelength, the light of the second wavelength, and the third light of the third wavelength on a first position, a second position, and a third position, respectively, on an optical axis, the first position, the second position, the third position being difference from each other, and wherein a distance between the first position and the second position is equal to a difference between the first focal length and the second focal length, and a distance between the second position and the third position is equal to a difference between the second focal length and the third focal length.

The fixed-focus optical system may include a first lens set configured to focus the first light of the first wavelength on the first position, a second lens set configured to focus the second light of the second wavelength on the second position, and a third lens set configured to focus the third light of the third wavelength on the third position.

The holographic display device, wherein a distance between the first lens set and the light source may be less than a distance between the second lens set and the light source, and a distance between the second lens set and the light source may be less than a distance between the third lens set and the light source.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
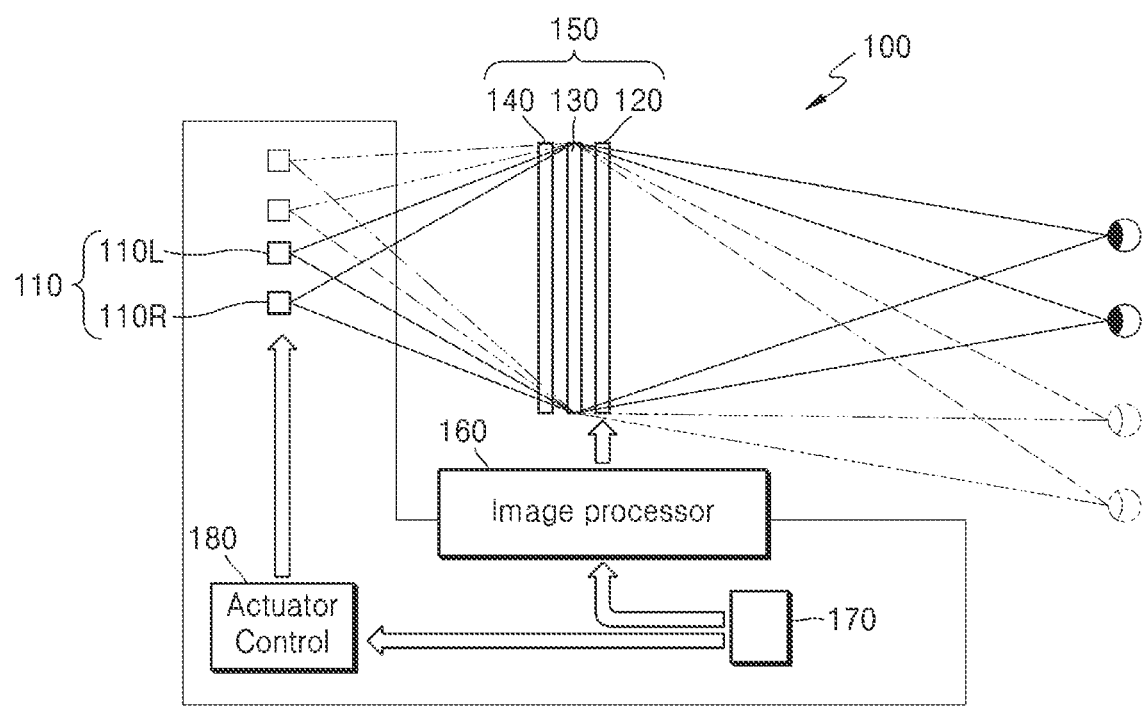
FIG. 1 is a configuration of a holographic display device according to an example embodiment.

Hereinafter, a holographic display device having reduced chromatic aberration will be described in detail with reference to the accompanying drawings. The same reference numerals refer to the same elements throughout. In the drawings, the sizes of constituent elements may be exaggerated for clarity. The example embodiments described below are merely exemplary, and various modifications may be possible from the example embodiments. In a layer structure described below, an expression such as "above" or "on" may include not only the meaning of "immediately on/under/to the left/to the right in a contact manner", but also the meaning of "on/under/to the left/to the right in a non-contact manner".

As used herein, the term "and/or" includes any and all combinations of one or more of the associated listed items. It will be further understood that the terms "comprises" and/or "comprising" used herein specify the presence of stated features or elements, but do not preclude the presence or addition of one or more other features or elements. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 illustrates a configuration of a holographic display device according to an example embodiment. Referring to FIG. 1, a holographic display device 100 according to an example embodiment may include a light source 110 for emitting light, a spatial light modulator 120 for forming a holographic pattern for modulating incident light to reproduce a holographic image, a focusing optical system 150 for focusing a holographic image on a space, and an image processor 160 for generating a holographic signal according to a holographic image to be reproduced and providing the holographic signal to the spatial light modulator 120. Furthermore, the holographic display device 100 may further include an eye tracker 170 for tracking an observer's pupil position and an actuator 180 for driving the light source 110 in response to information about the observer's pupil position tracked and provided by the eye tracker 170.

The light source 110 may include a first light source 110L for a holographic image to be formed in an observer's left eye and a second light source 110R for a holographic image to be formed in an observer's right eye. Each of the first and second light sources 110L and 110R may be arranged to provide illumination light incident obliquely on the spatial light modulator 120. For example, the first light source 110L may be on the opposite side of the observer's left eye with respect to the spatial light modulator 120, and the second light source 110R may be on the opposite side of the observer's right eye with respect to the spatial light modulator 120.

The first and second light sources 110L and 110R may also include laser diodes to provide illumination light having relatively high coherence. However, example embodiments are not limited thereto. For example, the first and second light sources 110L and 110R may also include light-emitting diodes (LEDs) because illumination light may be sufficiently diffracted and modulated by the spatial light modulator 120 when the illumination light has some degree of spatial coherence. Any other light source in addition to the LEDs may also be used as long as the light source emits light with spatial coherence. FIG. 1 shows one of each of the first and second light sources 110L and 110R as an example, but the first and second light sources 110L and 110R may include an array of a plurality of light sources.

The spatial light modulator 120 may form a holographic pattern for modulating and diffracting illumination light emitted from the light source 110 according to a holographic signal provided from the image processor 160. The spatial light modulator 120 may use any one of a phase modulator capable of performing only phase modulation, an amplitude modulator capable of performing only amplitude modulation, and a complex modulator capable of performing both phase modulation and amplitude modulation. As an example the spatial light modulator 120 is shown as a transmissive spatial light modulator in FIG. 1, however, example embodiments are not limited thereto, and a reflective spatial light modulator may also be used. As a transmissive spatial light modulator, the spatial light modulator 120 may use a semiconductor modulator based on a compound semiconductor such as gallium arsenide (GaAs), or a liquid crystal device (LCD). As a reflective spatial light modulator, the spatial light modulator 120 may use, for example, a digital micromirror device (DMD), liquid crystal on silicon (LCoS), or a semiconductor modulator.

The image processor 160 may be configured to generate a holographic signal according to a holographic image to be provided to an observer, provide the holographic signal to the spatial light modulator 120, and control operations of the light source 110. For example, the image processor 160 may control turning on and off the first and second light sources 110L and 110R. The image processor 160 may be implemented using software, or may be implemented in the form of a semiconductor chip in which functions of such software are embedded.

The eye tracker 170 may obtain an image of an observer through a camera or the like, detect an observer's pupil in the image, and analyze a position of the observer's pupil. The eye tracker 170 may track a position change of the observer's pupil in real time and provide the result to the image processor 160. The image processor 160 may then generate a holographic signal in response to the information about the observer's pupil position provided from the eye tracker 170. For example, the image processor 160 may generate a holographic signal in accordance with a viewpoint change due to an observer's position change, and may provide the generated holographic signal to the spatial light modulator 120. Also, the image processor 160 may change positions of the first and second light sources 110L and 110R by controlling the actuator 180 to move illumination light toward an observer's pupil position.

The focusing optical system 150 is configured to focus reproduced light, formed by modulation of illumination light by the spatial light modulator 120, to form a holographic image on a predetermined space. For example, the focusing optical system 150 may focus reproduced light on the observer's pupil position.

The focusing optical system 150 may include a fixed-focus optical system 140 having a fixed focal length and a variable focus optical system 130 in which a focal length is changed by electrical control. The variable focus optical system 130 may change a focal length in response to a change in a distance between an observer and the holographic display device 100. For example, when receiving information from the eye tracker 170 that an observer is moving away from the holographic display device 100, the variable focus optical system 130 may increase a focal length. On the other hand, when receiving information that an observer is approaching the holographic display device 100, the variable focus optical system 130 may reduce the focal length.

When a refractive lens element is used as the fixed-focus optical system 140 and the variable focus optical system 130, the volume of the focusing optical system 150 may be larger. As a result, it may become more difficult to manufacture a relatively thin holographic display device 100. According to the example embodiment, in order to reduce a thickness of the holographic display device 100, a diffractive lens element may be used as the fixed-focus optical system 140 and the variable focus optical system 130. For example, the variable focus optical system 130 may include a variable focus diffractive lens element including a liquid crystal panel. The variable focus diffractive lens element may act as a Fresnel lens by being configured to adjust the phase of light passing through the liquid crystal panel. For example, liquid crystal in the liquid crystal panel may form a geometrical phased array such as a concentric circle, so that the variable focus diffractive lens element acts as a lens, and a focal length may be adjusted by changing the phased array of the liquid crystal.

Figure 2:
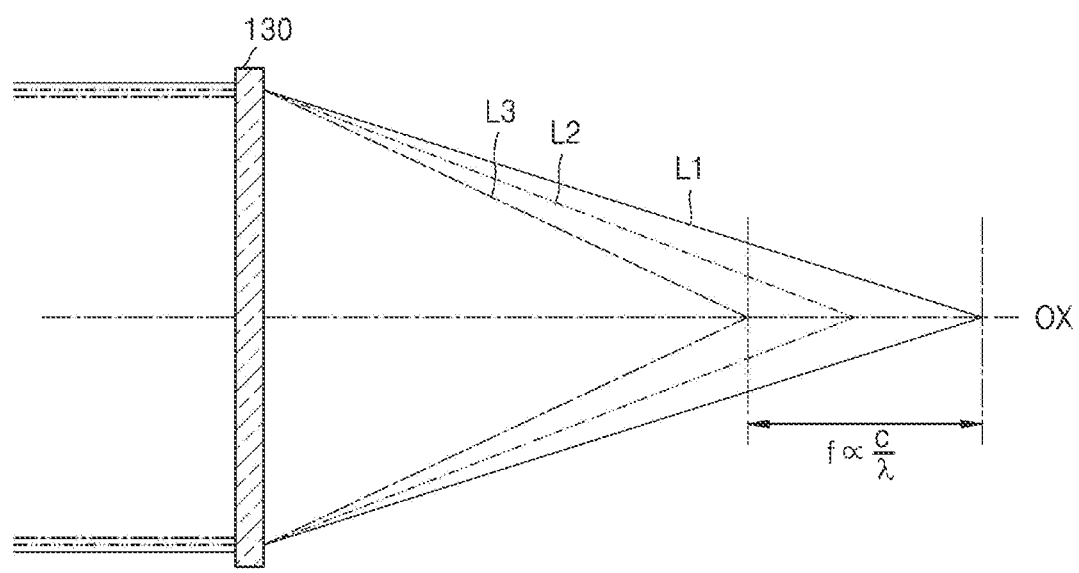
FIG. 2 is a cross-sectional view of an example of chromatic aberration caused by a variable focus diffractive lens element having a positive refractive power according to an example embodiment.

Furthermore, according to an example embodiment, both the fixed-focus optical system 140 and the variable focus optical system 130 may have a positive refractive power. For example, both the fixed-focus optical system 140 and the variable focus optical system 130 may act as convex lenses. Since a diffraction angle of light passing through a diffractive lens element is proportional to a wavelength length of incident light, when light is transmitted through the diffractive lens element acting like a convex lens, the diffractive lens element generally causes chromatic aberration opposite to that caused by a refractive lens. For example, FIG. 2 is a cross-sectional view of an example of chromatic aberration caused by a variable focus diffractive lens element having a positive refractive power used as the variable focus optical system 130. Referring to FIG. 2, when light L1 having a first wavelength, light L2 having a second wavelength that is longer than the first wavelength, and light L3 having a third wavelength that is longer than the second wavelength are incident on a variable focus diffractive lens element, the light L3 having the longest third wavelength is diffracted at the greatest angle and the light L1 having the shortest first wavelength is diffracted at the smallest angle. Then, positions where the lights L1, L2, and L3 of the first, second, and third wavelengths are focused on an optical axis OX are changed. For example, a focal length of a variable focus diffractive lens element for red light may be the shortest and a focal length of a variable focus diffractive lens element for blue light may be the longest.

Figure 3:
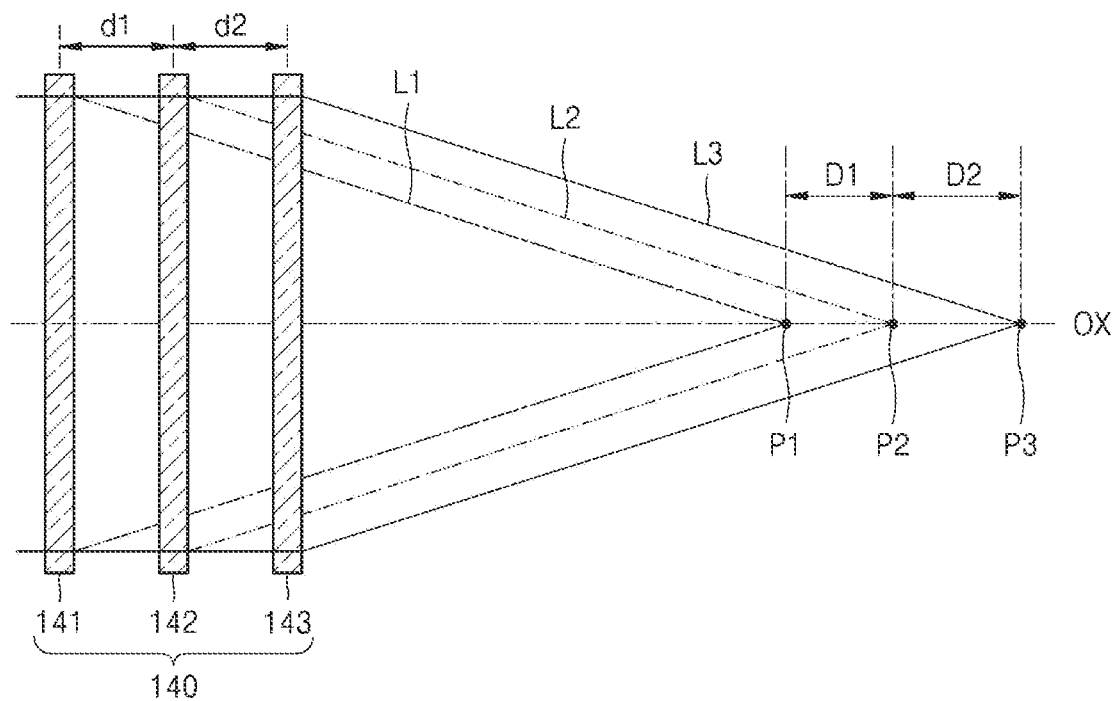
FIG. 3 is a cross-sectional view of the configuration and operation of a fixed-focus optical system having a positive refractive power according to an example embodiment.

In order to compensate for chromatic aberration caused by the variable focus optical system 130 including the variable focus diffractive lens elements, the fixed-focus optical system 140 may be configured to respectively focus the lights L1, L2, and L3 of the first, second, and third wavelengths on different positions on the optical axis OX. For example, FIG. 3 is a cross-sectional view of configuration and operation of the fixed-focus optical system 140 having a positive refractive power according to an example embodiment. Referring to FIG. 3, the fixed-focus optical system 140 may include a first lens set 141 for focusing the light L1 of the first wavelength on a first position P1 on an optical axis OX, a second lens set 142 for focusing the light L2 of the second wavelength on a second position P2 on the optical axis OX different from the first position P1, and a third lens set 143 focusing the light L3 of the third wavelength on a third position P3 on the optical axis OX different from the first and second positions P1 and P2. The first lens set 141 transmits the lights L2 and L3 of the second and third wavelengths without diffraction, the second lens set 142 transmits the lights L1 and L3 of the first and third wavelengths without diffraction, and the third lens set 143 transmits the lights L1 and L2 of first and second wavelengths without diffraction.

The first, second, and third positions P1, P2, and P3 are selected to cancel the chromatic aberration caused by the variable focus optical system 130. For example, since a focal length of a variable focus diffractive lens element for the light L3 of the third wavelength is the shortest, the third position P3 is arranged farthest away from the variable focus diffractive lens element compared to the first and second positions P1 and P2. In other words, a distance between the light source 110 and the first position P1 may be less than a distance between the light source 110 and the second position P2, and the distance between the light source 110 and the second position P2 may be less than a distance between the light source 110 and the third position P3. Also, a distance D1 between the first position P1 and the second position P2 on the optical axis OX may be equal to a difference between a focal length of a variable focus diffractive lens element for the light L1 of the first wavelength and a focal length of a variable focus diffractive lens element for the light L2 of the second wavelength. Furthermore, a distance D2 between the second position P2 and the third position P3 on the optical axis OX may be equal to a difference between the focal length of the variable focus diffractive lens element for the light L2 of the second wavelength and the focal length of the variable focus diffractive lens element for the light L3 of the third wavelength.

For this, the first, second, and third lens sets 141, 142, and 143 may be arranged at different positions on the optical axis OX. For example, a distance between the light source 110 and the first lens set 141 may be less than a distance between the light source 110 and the second lens set 142, and the distance between the light source 110 and the second lens set 142 may be less than a distance between the light source 110 and the third lens set 143. In other words, the first lens set 141, the second lens set 142, and the third lens set 143 may be sequentially arranged in a traveling direction of illumination light emitted from the light source 110.

A focal length of the first lens set 141 for the light L1 of the first wavelength, a focal length of the second lens set 142 for the light L2 of the second wavelength, and a focal length of the third lens set 143 for the light L3 may be equal to each other, but are not limited thereto. Specific positions on the optical axis OX of the first, second, and third lens sets 141, 142, and 143 may be determined according to the focal lengths of the first, second, and third lens sets 141, 142, and 143 and the first, second, and third positions P1, P2 and P3. When the focal length of the first lens set 141 for the light L1 of the first wavelength, the focal length of the second lens set 142 for the light L2 of the second wavelength, and the focal length of the third lens set 143 for the light L3 are equal to each other, a distance d1 between the first lens set 141 and the second lens set 142 may be equal to a distance D1 between the first position P1 and the second position P2. A distance d2 between the second lens set 142 and the third lens set 143 may be the same as a distance D2 between the second position P2 and the third position P3.

Figure 4:
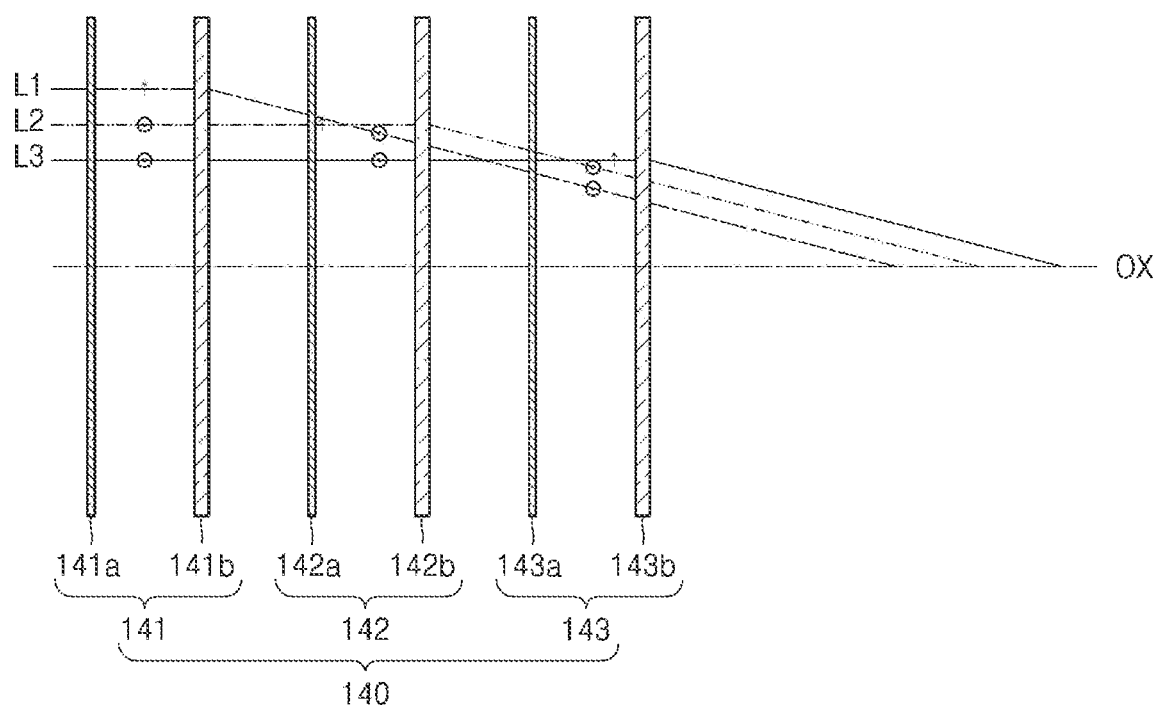
FIG. 4 is a cross-sectional view of an example of the configuration and operation of a fixed-focus optical system according to an example embodiment.

In order to allow the first, second, and third lens sets 141, 142, and 143 to focus only the corresponding lights L1, L2, and L3 of the first, second, and third wavelengths, respectively, the first, second, and third lens sets 141, 141, 142, and 143 may be configured in various manners. For example, FIG. 4 is a cross-sectional view of an example of the configuration and operation of the fixed-focus optical system 140 according to an example embodiment. Referring to FIG. 4, the first lens set 141 may include a first wavelength-selective polarization conversion element 141a and a first anisotropic diffractive lens element 141b, the second lens set 142 may include a second wavelength-selective polarization conversion element 142a and a second anisotropic diffractive lens element 142b, and the third lens set 143 may include a third wavelength-selective polarization conversion element 143a and a third anisotropic diffractive lens element 143b. The first wavelength-selective polarization conversion element 141a, the first anisotropic diffractive lens element 141b, the second wavelength-selective polarization conversion element 142a, the second anisotropic diffractive lens element 142b, the third wavelength-selective polarization conversion element 143a, and the third anisotropic diffractive lens element 143b may be sequentially arranged along the optical axis OX in a direction away from the light source 110, that is, in a traveling direction of illumination light emitted by the light source 110.

The first wavelength-selective polarization conversion element 141a may be configured to convert the polarization of incident light such that the light L1 of the first wavelength has a first linear polarization component and the lights L2 and L3 of the second and third wavelengths have a second linear polarization component orthogonal to the first linear polarization component. The second wavelength-selective polarization conversion element 142a is configured to convert the polarization of incident light such that the light L2 of the second wavelength has the first linear polarization component and the lights L1 and L3 of the first and third wavelengths have the second linear polarization component. The third wavelength-selective polarization conversion element 143a is configured to convert the polarization of incident light such that the light L3 of the third wavelength has the first linear polarization component and the lights L1 and L2 of first and second wavelengths have the second linear polarization component. The first, second, and third anisotropic diffractive lens elements 141b, 142b, and 143b may be configured to diffract and focus light of the first linear polarization component and transmit light of the second linear polarization component without diffraction.

For example, among the lights L1, L2 and L3 of the first, second, and third wavelengths passing through the first wavelength-selective polarization conversion element 141a, the light L1 of the first wavelength has a first linear polarization component, and the lights L2 and L3 of the second and third wavelengths have a second linear polarization component. The light L1 of the first wavelength having the first linear polarization component is diffracted by the first anisotropic diffractive lens element 141b and the lights L2 and L3 of the second and third wavelengths having the second linear polarization light component pass through the first anisotropic diffractive lens element 141b without diffraction. After passing through the first anisotropic diffractive lens element 141b, the lights L1, L2 and L3 of the first, second, and third wavelengths are incident on the second wavelength selective polarizing conversion element 142a. The light L1 of the first wavelength is polarized to have the second linear polarization component while passing through the second wavelength-selective polarization conversion element 142a and the light L2 of the second wavelength is polarized to have the first linear polarization component by the second wavelength-selective polarization conversion element 142a. Therefore, the lights L1 and L3 of the first, second, and third wavelengths are not diffracted by the second anisotropic diffractive lens element 142b and only the light L2 of the second wavelength is diffracted by the second anisotropic diffractive lens element 142b. After passing through the second anisotropic diffractive lens element 142b, the lights L1, L2 and L3 of the first, second, and third wavelengths are incident on the third wavelength selective polarizing conversion element 143a. The light L2 of the second wavelength is polarized to have the second linear polarization component by the third wavelength-selective polarization conversion element 143a and the light L3 of the third wavelength is polarized to have the first linear polarization component by the third wavelength-selective polarization conversion element 143a. Therefore, the lights L1 and L2 of first and second wavelengths are not diffracted by the third anisotropic diffractive lens element 143b and only the light L3 of the third wavelength is diffracted by the third anisotropic diffractive lens element 143b. As a result, among the lights finally focused by the fixed-focus optical system 140, the lights L1 and L2 of first and second wavelengths may have the second linear polarization component and the light L3 of the third wavelength may have the first linear polarization component.

Figure 5:
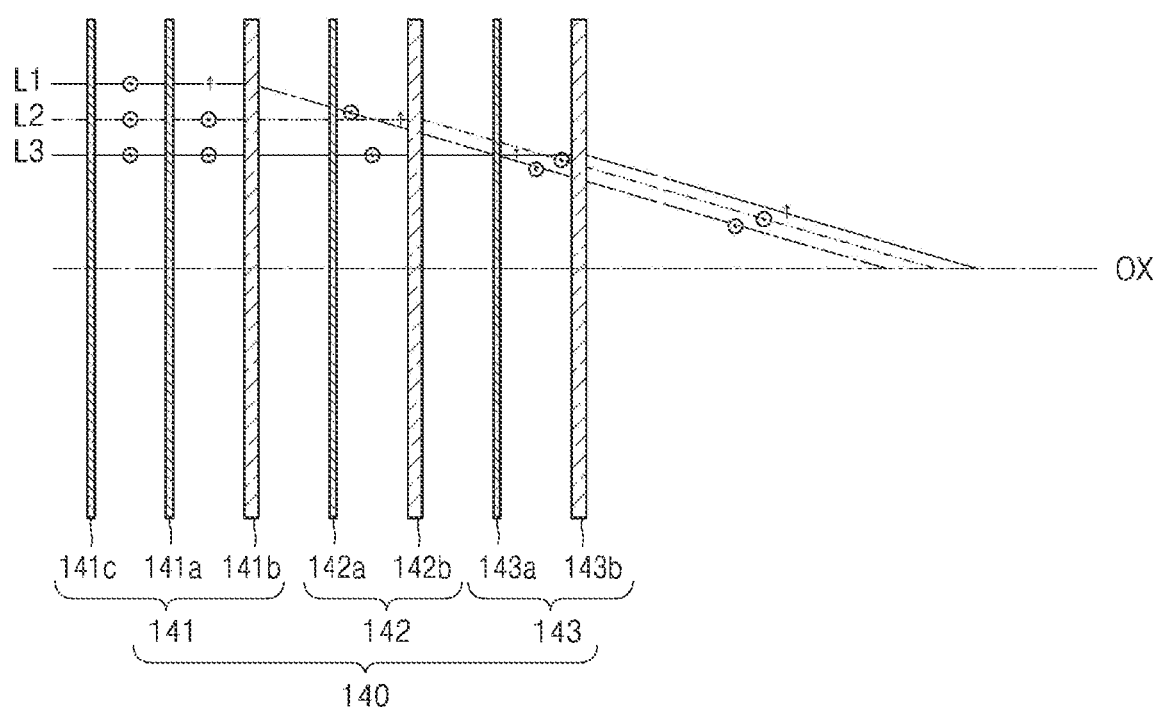
FIG. 5 is a cross-sectional view of an example of the configuration and operation of a fixed-focus optical system according to an example embodiment.

FIG. 5 is a cross-sectional view of an example of the configuration and operation of the fixed-focus optical system 140 according to an example embodiment. Referring to FIG. 5, the first lens set 141 may further include a polarizing plate 141c configured to transmit only a second linear polarization component of incident lights. The polarizing plate 141c may be in front of the first wavelength-selective polarization conversion element 141a, closer to the light source 110 than the first wavelength-selective polarization conversion element 141a, on an optical path. The first wavelength-selective polarization conversion element 141a is configured to rotate a polarization direction of the light L1 of the first wavelength, among incident lights, by 90 degrees and to transmit the lights L2 and L3 of the second and third wavelengths without any rotation. Accordingly, among the lights passing through the first wavelength-selective polarization conversion element 141a, the light L1 of the first wavelength has the first linear polarization component, and the lights L2 and L3 of the second and third wavelengths have the second linear polarization component. Only the light L1 of the first wavelength is then diffracted by the first anisotropic diffractive lens element 141b, and lights L2 and L3 of the second and third wavelengths are transmitted without diffraction.

Also, the second wavelength-selective polarization conversion element 142a is configured to rotate a polarization direction of the lights L1 and L2 of first and second wavelengths, among incident lights, by 90 degrees and to transmit the light L3 of the third wavelength without any rotation. Accordingly, among the lights passing through the second wavelength-selective polarization conversion element 142a, the lights L1 and L3 of the first and third wavelengths have the second linear polarization component, and the light L2 of the second wavelength has the first linear polarization component. Only the light L2 of the second wavelength is then diffracted by the second anisotropic diffractive lens element 142b, and lights L1 and L3 of the first and third wavelengths are transmitted without diffraction.

Also, the third wavelength-selective polarization conversion element 143a is configured to rotate a polarization direction of the lights L2 and L3 of the second and third wavelengths, among incident lights, by 90 degrees and to transmit the light L1 of the first wavelength without any rotation. Accordingly, among the lights passing through the third wavelength-selective polarization conversion element 143a, the lights L1 and L2 of first and second wavelengths have the second linear polarization component, and the light L3 of the third wavelength has the first linear polarization component. Only the light L3 of the third wavelength is then diffracted by the third anisotropic diffractive lens element 143b, and lights L1 and L2 of the first and second wavelengths are transmitted without diffraction.

Figure 6:
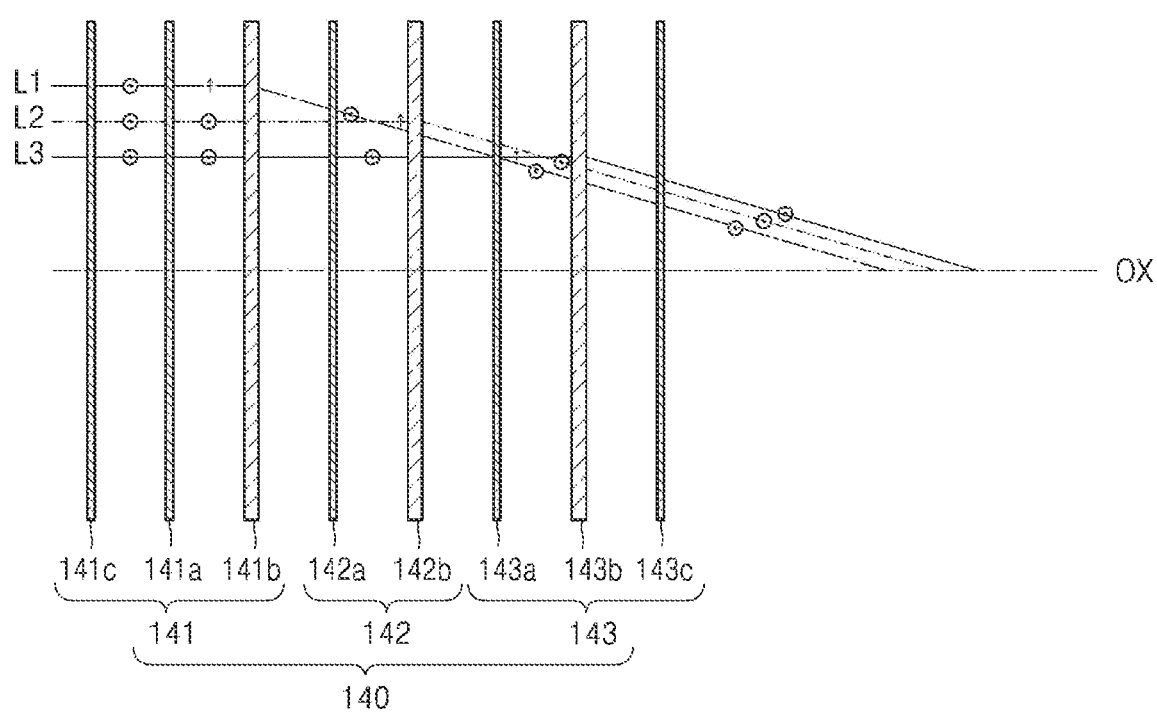
FIG. 6 is a cross-sectional view of an example of the configuration and operation of a fixed-focus optical system according to an example embodiment.

FIG. 6 is a cross-sectional view of an example of the configuration and operation of the fixed-focus optical system 140 according to an example embodiment. Referring to FIG. 6, the third lens set 143 may further include a fourth wavelength-selective polarization conversion element 143c for converting the polarization of incident light such that the lights L1, L2, and L3 of the first, second, and third wavelengths to have identical linear polarization components. The fourth wavelength-selective polarization conversion element 143c may be placed behind the third anisotropic diffractive lens element 143b, further away from the light source 110 than the third anisotropic diffractive lens element 143b, in a light traveling direction on an optical path. The remaining configuration of the fixed-focus optical system 140 shown in FIG. 6 may be the same as that of the fixed-focus optical system 140 shown in FIG. 5. For example, the fourth wavelength-selective polarization conversion element 143c, among incident lights, may transmit the lights L1 and L2 of first and second wavelengths without any rotation and rotate a polarization direction of the light L3 of the third wavelength by 90 degrees. The lights L1, L2, and L3 of the first, second, and third wavelengths finally focused by the fixed-focus optical system 140 may all have a second linear polarization component.

Figure 7:
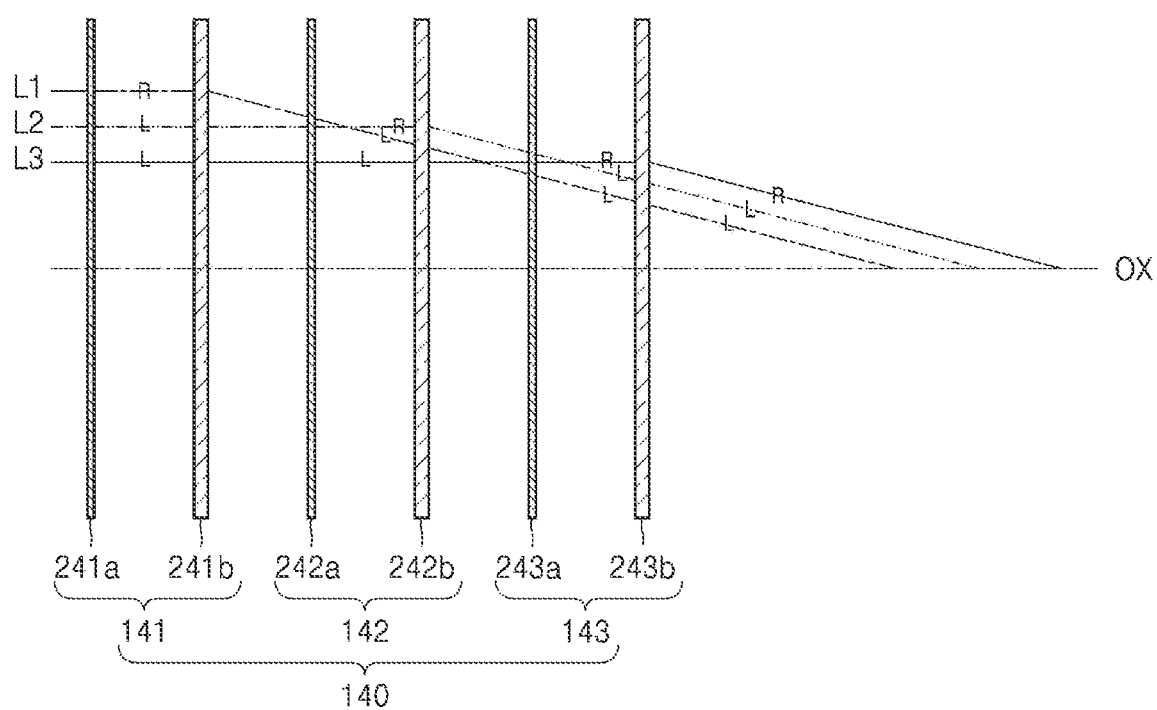
FIG. 7 is a cross-sectional view of an example of the configuration and operation of a fixed-focus optical system according to an example embodiment.

However, example embodiments are not limited thereto, and it is possible to implement the fixed-focus optical system 140 that performs the above-described operation using a circular polarization characteristic. For example, FIG. 7 is a cross-sectional view of an example of the configuration and operation of the fixed-focus optical system 140 according to an example embodiment. Referring to FIG. 7, the first lens set 141 may include a first wavelength-selective polarization conversion element 241a and a first anisotropic diffractive lens element 241b, the second lens set 142 may include a second wavelength-selective polarization conversion element 242a and a second anisotropic diffractive lens element 242b, and the third lens set 143 may include a third wavelength-selective polarization conversion element 243a and a third anisotropic diffractive lens element 243b.

The first wavelength-selective polarization conversion element 241a is configured to convert the polarization of incident light such that the light L1 of the first wavelength has a first circular polarization component (e.g., a right circular polarization component) and the lights L2 and L3 of the second and third wavelengths have a second circular polarization component (e.g., a left circular polarization component) opposite to the first circular polarization component. The second wavelength-selective polarization conversion element 242a is configured to convert the polarization of incident light such that the light L2 of the second wavelength has the first circular polarization component and the lights L1 and L3 of the first and third wavelengths have the second circular polarization component. The third wavelength-selective polarization conversion element 243a is configured to convert the polarization of incident light such that the light L3 of the third wavelength has the first circular polarization component and the lights L1 and L2 of first and second wavelengths have the second circular polarization component. The first, second, and third anisotropic diffractive lens elements 241b, 242b, and 243b are configured to diffract and focus light of the first circular polarization component and transmit light of the second circular polarization component without diffraction.

Figure 8:
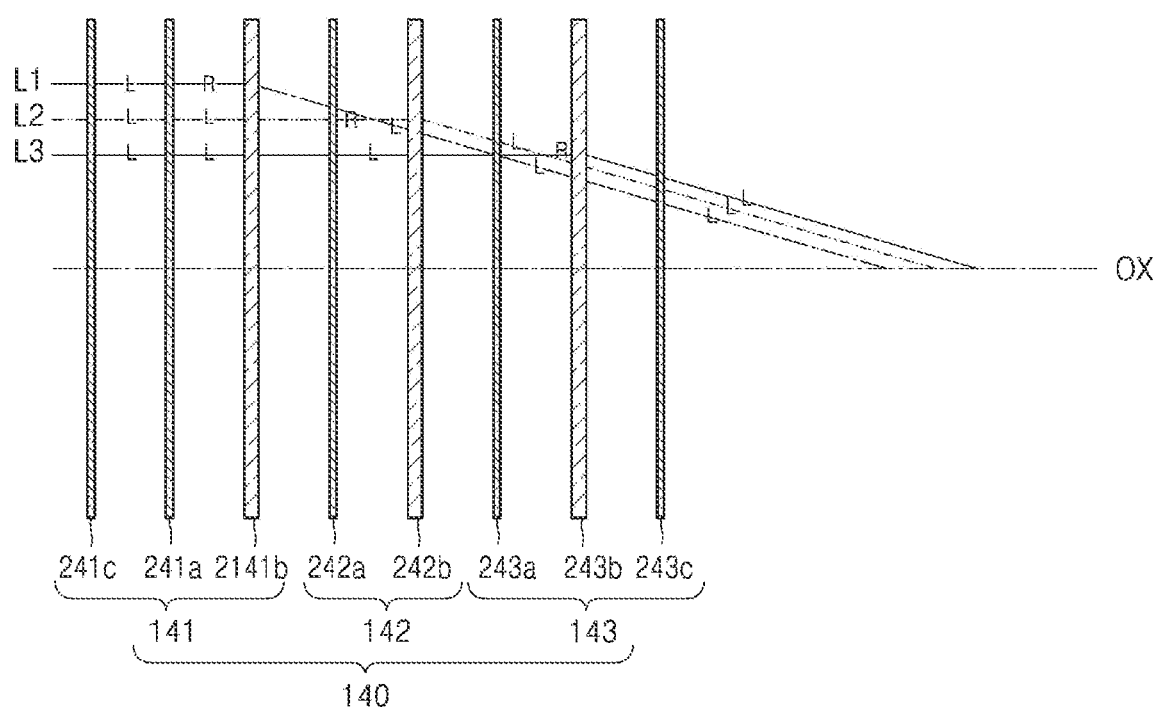
FIG. 8 is a cross-sectional view of an example of the configuration and operation of a fixed-focus optical system according to an example embodiment.

FIG. 8 is a cross-sectional view of an example of the configuration and operation of the fixed-focus optical system 140 according to an example embodiment. Referring to FIG. 8, the first lens set 141 may further include a polarizing plate 241c for transmitting only a second circular polarization component among incident lights. The polarizing plate 241c may be in front of the first wavelength-selective polarization conversion element 241a, closer to the light source 110 than the first wavelength-selective polarization conversion element 241a, on an optical path. The first wavelength-selective polarization conversion element 241a is configured to rotate a polarization direction of the light L1 of the first wavelength, among incident lights, in the opposite direction and to transmit the lights L2 and L3 of the second and third wavelengths without any rotation. Accordingly, among the lights passing through the first wavelength-selective polarization conversion element 241a, the light L1 of the first wavelength has a first circular polarization component, and the lights L2 and L3 of the second and third wavelengths have the second circular polarization component. Only the light L1 of the first wavelength is then diffracted and focused by the first anisotropic diffractive lens element 241b, and lights L2 and L3 of the second and third wavelengths are transmitted without diffraction.

Also, the second wavelength-selective polarization conversion element 242a is configured to rotate a polarization direction of the lights L1 and L2 of first and second wavelengths, among incident lights, in the opposite direction and to transmit the light L3 of the third wavelength without rotation. Accordingly, among the lights passing through the second wavelength-selective polarization conversion element 242a, the lights L1 and L3 of the first and third wavelengths have the second circular polarization component, and the light L2 of the second wavelength has the first circular polarization component. Only the light L2 of the second wavelength is then diffracted and focused by the second anisotropic diffractive lens element 242b, and lights L1 and L3 of the first and third wavelengths are transmitted without diffraction.

The third wavelength-selective polarization conversion element 243a is configured to rotate a polarization direction of the lights L2 and L3 of the second and third wavelengths, among incident lights, in the opposite direction and to transmit the light L1 of the first wavelength without any rotation. Accordingly, among the lights passing through the third wavelength-selective polarization conversion element 243a, the lights L1 and L2 of first and second wavelengths have the second circular polarization component, and the light L3 of the third wavelength has the first circular polarization component. Only the light L3 of the third wavelength is then diffracted by the third anisotropic diffractive lens element 243b, and lights L1 and L2 of the first and second wavelengths are transmitted without diffraction.

Referring to FIG. 8, the third lens set 143 may further include a fourth wavelength-selective polarization conversion element 243c for converting the polarization of incident light such that the lights L1, L2, and L3 of the first, second, and third wavelengths have identical circular polarization components. The fourth wavelength-selective polarization conversion element 243c is behind the third anisotropic diffractive lens element 243b, further away from the light source 110 than the third anisotropic diffractive lens element 243b, in a light traveling direction on an optical path. For example, the fourth wavelength-selective polarization conversion element 243c, among incident lights, may transmit the lights L1 and L2 of first and second wavelengths without rotation and rotate a polarization direction of the light L3 of the third wavelength in the opposite direction. The lights L1, L2, and L3 of the first, second, and third wavelengths finally focused by the fixed-focus optical system 140 may all have a second circular polarization component.

Figure 9:
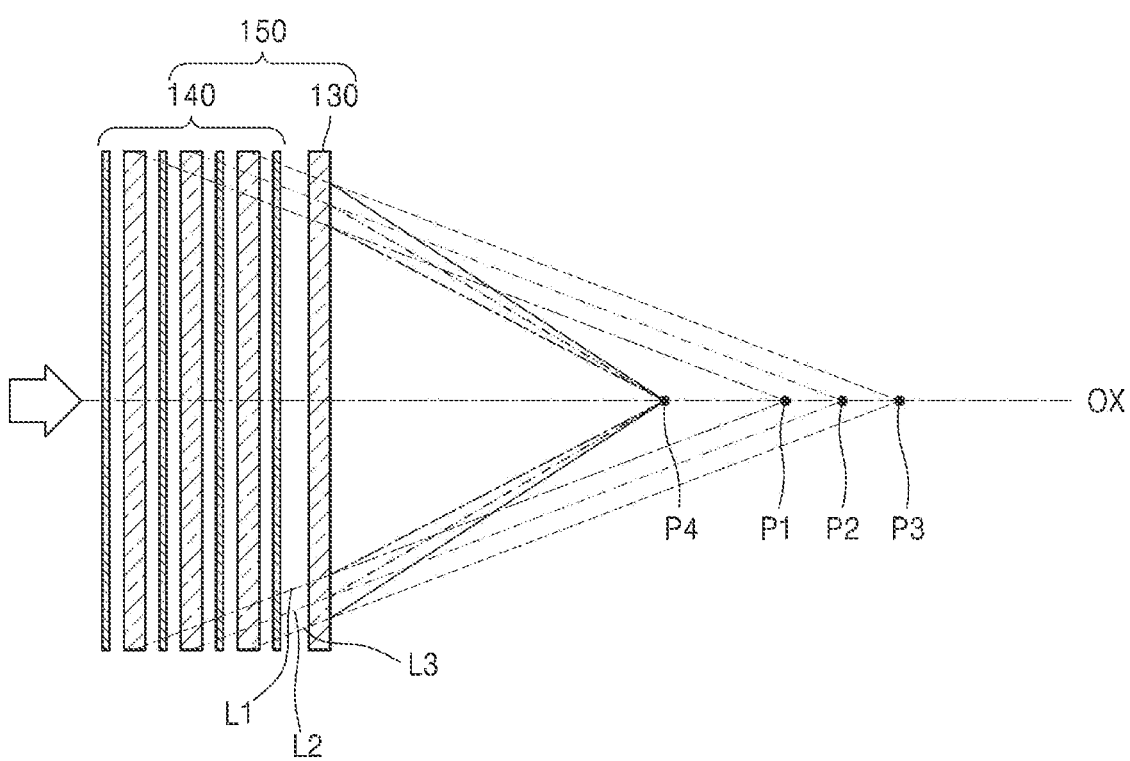
FIG. 9 is a cross-sectional view of an example of a reduction in chromatic aberration by a combination of a fixed-focus optical system and a variable focus optical system according to an example embodiment.

FIG. 9 is a cross-sectional view of an example of a reduction in chromatic aberration due to a combination of the fixed-focus optical system 140 and the variable focus optical system 130. Referring to FIG. 9, the light L1 of the first wavelength is focused on the first position P1 on the optical axis OX by the fixed-focus optical system 140, the light L2 of the second wavelength is focused on the second position P2 on the optical axis OX, and the light L3 of the third wavelength is focused on the third position P3 on the optical axis OX. A distance between the fixed-focus optical system 140 and the first position P1 is less than a distance between the fixed-focus optical system 140 and the second position P2, and the distance between the fixed-focus optical system 140 and the second position P2 may be less than a distance between the fixed-focus optical system 140 and the third position P3.

According to an example embodiment, as shown in FIG. 2, the variable focus optical system 130 including a variable focus diffractive lens element having a positive refractive power has a shortest focal length for the light L3 of the third wavelength and a longest focal length for the light L1 of the first wavelength. Therefore, when the fixed-focus optical system 140 is configured such that the first, second, and third positions P1, P2, and P3 are substantially opposite to the chromatic aberration caused by the variable focus optical system 130, the chromatic aberration caused by the variable focus optical system 130 may be canceled by the fixed-focus optical system 140. For example, a distance between the first position P1 and the second position P2 is the same as a difference between a focal length of the variable focus optical system 130 for the light L1 of the first wavelength and a focal length for the light L2 of the second wavelength, and a distance between the second position P2 and the third position P3 may be the same as a difference between the focal length of the variable focus optical system 130 for the light L2 of the second wavelength and the focal length corresponding to the third light wavelength L3. The focusing optical system 150 including the fixed-focus optical system 140 and the variable focus optical system 130 may focus the lights L1, L2, and L3 of the first, second, and third wavelengths to a fourth position P4 without chromatic aberration.

Figure 10:
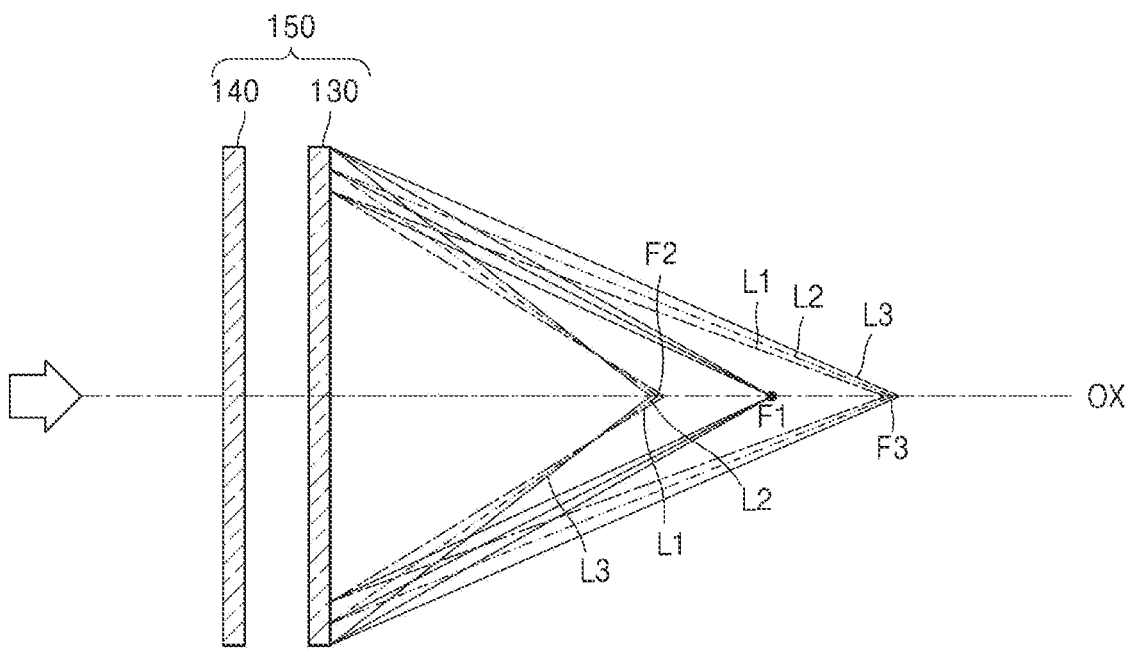
FIG. 10 is a cross-sectional view of an example of a change in chromatic aberration caused by a focal length change of a variable focus optical system according to an example embodiment.

According to an example embodiment, a focal length of the variable focus optical system 130 changes according to an observer's position, and the degree of chromatic aberration changes as the focal length changes. Meanwhile, a focal length of the fixed-focus optical system 140 is always fixed. As a result, the chromatic aberration may be completely canceled or insufficiently compensated or over-compensated according to the focal length of the variable focus optical system 130. For example, FIG. 10 is a cross-sectional view of an example of a change in chromatic aberration caused by a focal length change of the variable focus optical system 130. Referring to FIG. 10, when the entire focal length of the focusing optical system 150 including the fixed-focus optical system 140 and the variable focus optical system 130 is F1, the chromatic aberration caused by the variable focus optical system 130 is completely canceled. When the focal length of the focusing optical system 150 is shortened to F2, the chromatic aberration caused by the variable focus optical system 130 is insufficiently compensated. When the focal length of the focusing optical system 150 is increased to F3, the chromatic aberration caused by the variable focus optical system 130 is over-compensated.

However, when a difference between focus positions of the lights L1, L2, and L3 of the first, second, and third wavelengths at the focal lengths F2 and F3 is sufficiently small, an observer may not detect the chromatic aberration. For example, when the difference between the focus positions of the lights L1, L2 and L3 of the first, second, and third wavelengths is less than a diameter of a permissible circle of confusion, the chromatic aberration may be considered to be canceled. Accordingly, the first, second, and third positions P1, P2, and P3 may be selected such that the chromatic aberration in a focus adjustment range of the variable focus optical system 130 including a variable focus diffractive lens element is canceled to be less than the diameter of the permissible circle of confusion. Alternatively, a region in which the chromatic aberration caused by the focusing optical system 150 including the fixed-focus optical system 140 and the variable focus optical system 130 is less than the diameter of the permissible circle of confusion may be selected as the focus adjustment range of the variable focus optical system 130.

According to example embodiments, both the fixed-focus optical system 140 and the variable focus optical system 130 may have a positive refractive power, and the chromatic aberration caused by the variable focus optical system 130 having one variable focus diffractive lens element may be compensated with the fixed-focus optical system 140 having a plurality of diffractive lens elements. However, example embodiments are not limited thereto, and according to an example embodiment, the fixed-focus optical system 140 may include only one fixed-focus diffractive lens element. In this case, it is possible to compensate the chromatic aberration caused by the fixed-focus optical system 140 having the positive refracting power with the variable focus optical system 130 having a negative refracting power.

Figure 11:
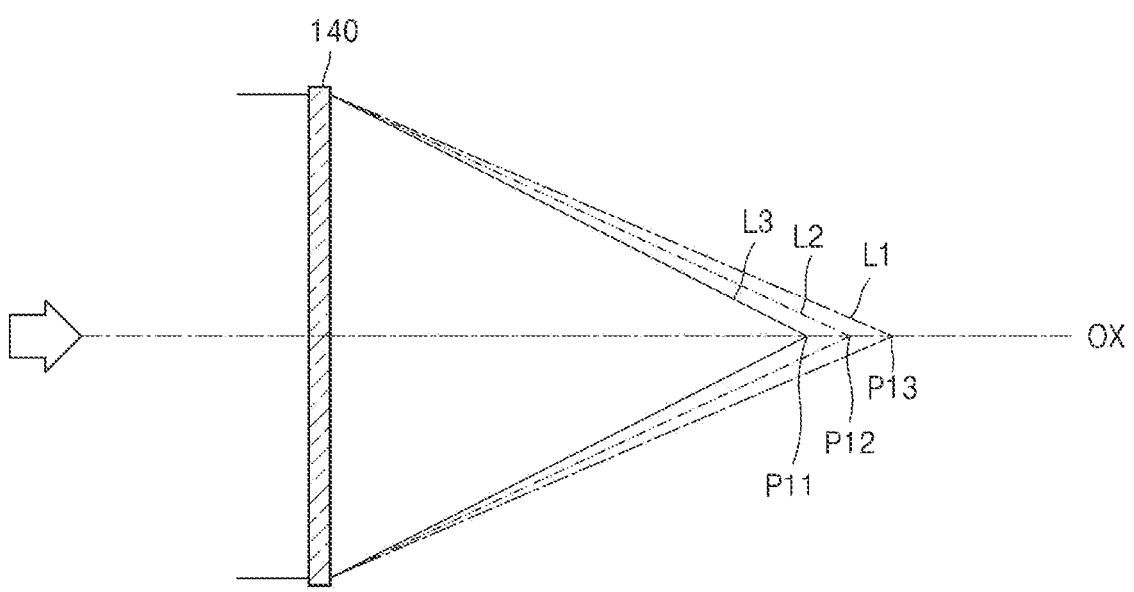
FIG. 11 is a cross-sectional view of an example of chromatic aberration caused by a fixed-focus diffractive lens element having a positive refractive power according to an example embodiment.

For example, FIG. 11 is a cross-sectional view of an example of chromatic aberration caused by a fixed-focus diffractive lens element having a positive refractive power used as the variable focus optical system 140. Referring to FIG. 11, when the lights L1, L2, and L3 of the first, second, and third wavelengths are incident, the light L3 of the third wavelength having the longest wavelength is diffracted at the greatest angle and the light L1 of the first wavelength having the shortest wavelength is diffracted at the smallest angle. Then, positions where the lights L1, L2, and L3 of the first, second, and third wavelengths are focused on the optical axis OX are changed. For example, the light L3 of the third wavelength having the longest wavelength is focused on a first position P11 closest to the fixed-focus optical system 140 on the optical axis OX, the light L2 of the second wavelength is focused on a second position P12 on the optical axis OX, and the light L1 of the first wavelength having the shortest wavelength is focused on the third position P13 farthest from the fixed-focus optical system 140 on the optical axis OX. In other words, the focal length of the fixed-focus optical system 140 for the light L1 of the first wavelength is longer than the focal length of the fixed-focus optical system 140 for the light L2 of the second wavelength, and the focal length of the fixed-focus optical system 140 for the light L2 of the second wavelength is longer than the focal length of the fixed-focus optical system 140 for the light L3 of the third wavelength.

In order to compensate for the chromatic aberration caused by the fixed-focus optical system 140 including such a fixed-focus diffractive lens element, the variable focus optical system 130 may include a variable focus diffractive lens element having a negative refracting power. This variable focus diffractive lens element may be configured to cause chromatic aberration opposite to the chromatic aberration caused by the fixed-focus diffractive lens element of the fixed-focus optical system 140.

Figure 12:
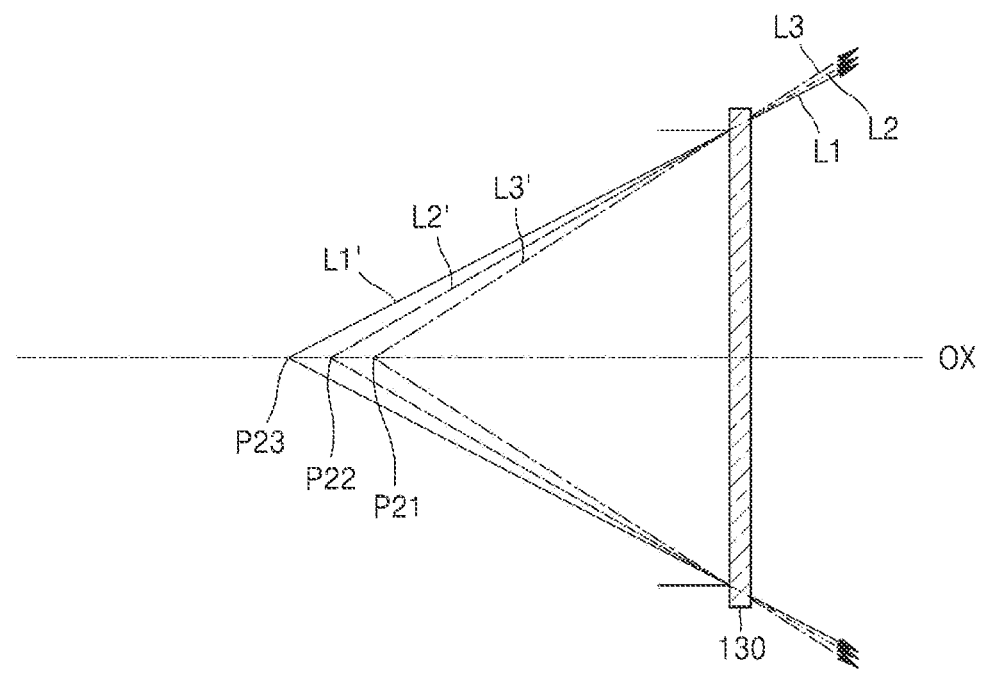
FIG. 12 is a cross-sectional view of an example of chromatic aberration caused by a variable focus diffractive lens element having a negative refractive power according to an example embodiment.

For example, FIG. 12 is a cross-sectional view of an example of chromatic aberration caused by a variable focus diffractive lens element having a negative refractive power used as the variable focus optical system 130. Since the variable focus diffractive lens element has a negative refractive power, light passing through the variable focus diffractive lens element diverges. The light L1 of the first wavelength having the shortest wavelength diverges at the smallest angle and the light L3 of the third wavelength having the longest wavelength diverges at the greatest angle. When light beams are extended in a direction opposite to a traveling direction of the lights L1, L2 and L3 of the first, second, and third wavelengths, extension lines of the light beams converge on the optical axis OX in a front direction of the variable focus optical system 130. A point at which the extension lines of the light beams converge is a virtual focus of the variable focus optical system 130.

As shown in FIG. 12, an extension line L1' of the light L1 of the first wavelength converges at a first position P21, an extension line L2' of the light L2 of the second wavelength converges at a second position P22, and an extension line L3' of the light L3 of the wavelength converges at a third position P23. A distance from the variable focus optical system 130 to the first position P21 is closer than a distance from the variable focus optical system 130 to the second position P22 and a distance from the variable focus optical system 130 to the second position P22 is closer than the distance from the variable focus optical system 130 to the third position P23. The chromatic aberration caused by the fixed-focus optical system 140 may be canceled in the focus adjustment range of the variable focus optical system 130 by selecting positions of the virtual focus of the variable focus optical system 130.

Figure 13:
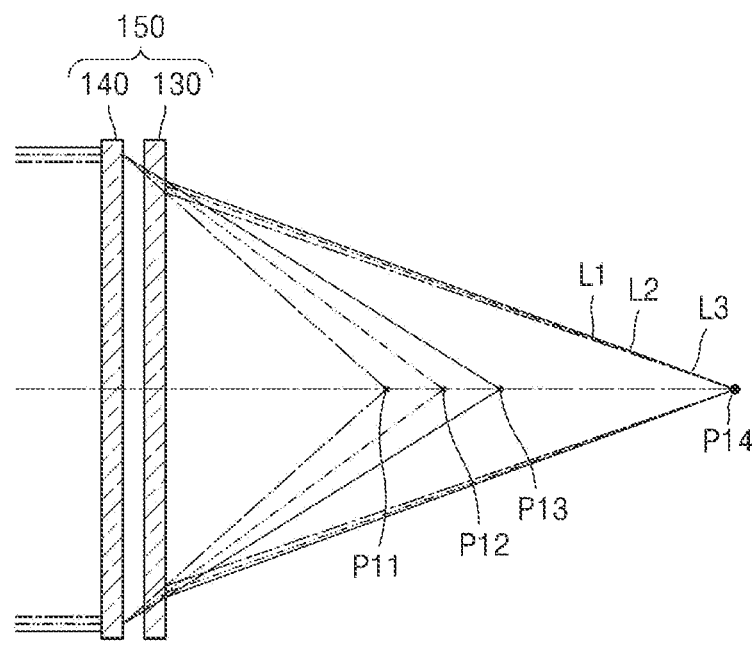
FIG. 13 is a cross-sectional view of an example of a reduction in chromatic aberration by a combination of a fixed-focus optical system and a variable focus optical system according to an example embodiment.

For example, FIG. 13 is a cross-sectional view of an example of a reduction in chromatic aberration based on a combination of the fixed-focus optical system 140 and the variable focus optical system 130. Referring to FIG. 13, the light L1 of the first wavelength is focused on the third position P13 on the optical axis OX by the fixed-focus optical system 140, the light L2 of the second wavelength is focused on the second position P12 on the optical axis OX, and the light L3 of the third wavelength is focused on the first position P11 on the optical axis OX. A distance between the fixed-focus optical system 140 and the first position P11 is less than a distance between the fixed-focus optical system 140 and the second position P12, and the distance between the fixed-focus optical system 140 and the second position P12 may be less than a distance between the fixed-focus optical system 140 and the third position P13.

Meanwhile, the variable focus optical system 130 including the variable focus diffractive lens element having a negative refracting power diverges the light L1 of the first wavelength having the shortest wavelength at the smallest angle and diverges the light L3 of the third wavelength having the longest wavelength at the greatest angle. Therefore, the chromatic aberration caused by the fixed-focus optical system 140 and the chromatic aberration caused by the variable focus optical system 130 are opposite to each other. The focusing optical system 150 including the fixed-focus optical system 140 and the variable focusing optical system 130 may then focus the lights L1, L2, and L3 of the first, second, and third wavelengths at a fourth position P14 on the optical axis OX farther than the third position P13 without chromatic aberration.

Furthermore, a focus position of the focusing optical system 150 including the fixed-focus optical system 140 and the variable focus optical system 130 also changes when the variable focus optical system 130 changes virtual focus positions in response to observer's position information. Accordingly, the degree of overall chromatic aberration caused by the focusing optical system 150 also changes. Therefore, the variable focus optical system 130 is configured to adjust a difference of the virtual focus positions for the lights L1, L2, and L3 of the first, second, and third wavelengths according to a focal length such that the overall chromatic aberration caused by the focusing optical system 150 in the focus adjustment range is canceled to be less than the diameter of a permissible circle of confusion. According to an example embodiment, a region in which the chromatic aberration caused by the focusing optical system 150 including the fixed-focus optical system 140 and the variable focus optical system 130 is less than the diameter of the permissible circle of confusion may be selected as the focus adjustment range of the variable focus optical system 130.

Figure 14:
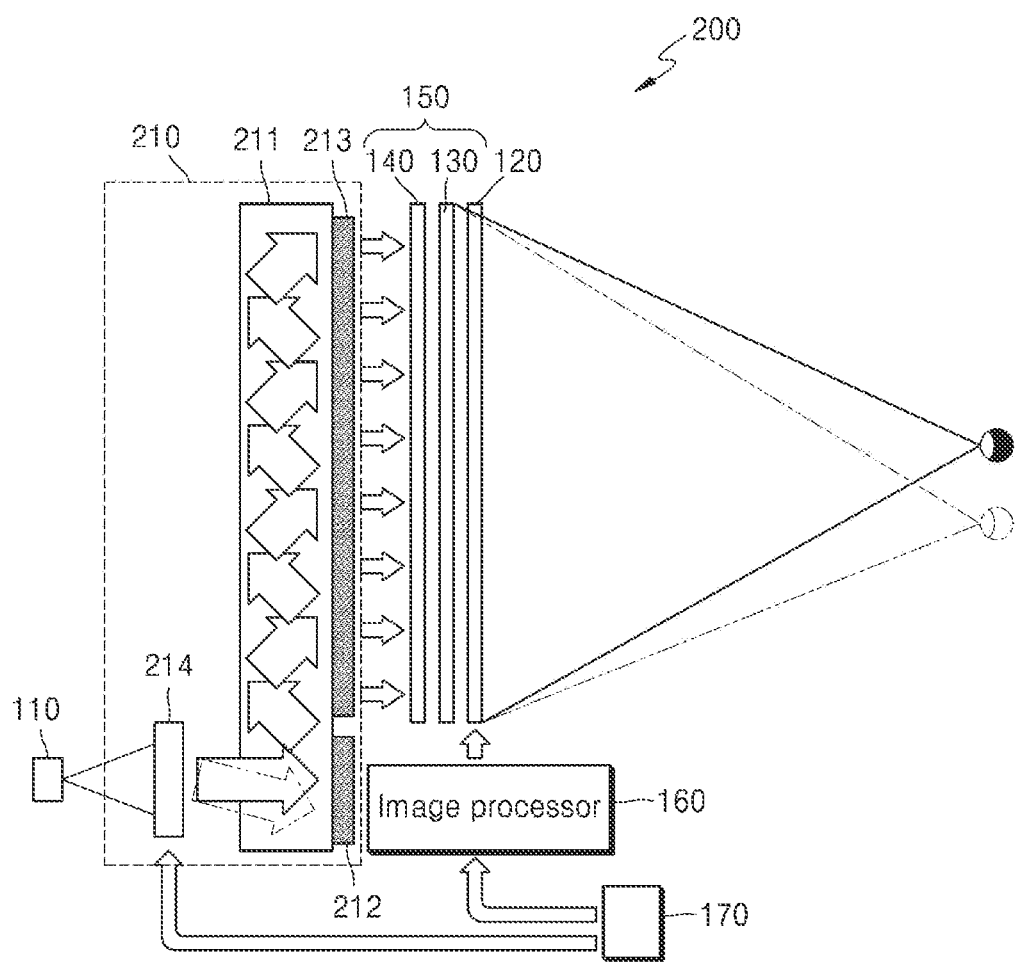
FIG. 14 is a configuration of a holographic display device according to an example embodiment.

FIG. 14 is a configuration diagram of a configuration of a holographic display device according to an example embodiment. Referring to FIG. 14, a holographic display device 200 according to an example embodiment may include the light source 110 for providing light, the spatial light modulator 120 for forming a holographic pattern for modulating incident light to reproduce a holographic image, the focusing optical system 150 for focusing a holographic image, the image processor 160 for generating a holographic signal according to a holographic image to be reproduced and providing the holographic signal to the spatial light modulator 120, an illumination optical system 210 for transmitting light emitted from the light source 110 to the spatial light modulator 120, and the eye tracker 170 for tracking an observer's pupil position.

The holographic display device 200 according to an example embodiment may provide a holographic image for the left eye and a holographic image for the right eye with a single light source 110 using the illumination optical system 210 which may be configured to divide light incident from the light source 110 and to move the lights toward a left-eye direction and a right-eye direction, respectively. For example, the illumination optical system 210 may include a transparent light guide plate 211 having an input coupler 212 and an output coupler 213, and a beam deflector 214 for providing light emitted from the light source 110 to the input coupler 212.

The beam deflector 214 may include a liquid crystal deflector configured to diffract incident light to produce two light beams traveling at different angles. The two light beams may be incident on the input coupler 212 at different angles, and further travel at different angles in the light guide plate 211. As a result, emission angles of the two light beams emitted through the output coupler 213 are also different from each other. The two light beams may pass through the focusing optical system 150 and the spatial light modulator 120 and may finally travel to the left and right eyes of the observer, respectively. The beam deflector 214 may also adjust an incident angle of the two light beams incident on the input coupler 212 in response to observer's pupil position information provided from the eye tracker 170.

The focusing optical system 150 may include the fixed-focus optical system 140 having a fixed focal length and the variable focus optical system 130 in which a focal length is changed by electrical control. The configuration and operations of the fixed-focus optical system 140 and the variable focus optical system 130 may be the same as those already described with reference to FIGS. 2 to 13.

Although the above-described holographic display device having reduced chromatic aberration have been described with reference to the example embodiments shown in the drawings, they are only examples. It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A focusing optical system comprises:
a fixed-focus optical system having a fixed focal length on an optical axis; and
a variable focus optical system having a focal length that is changed by electrical control,
wherein the fixed-focus optical system is configured to focus first light of a first wavelength, second light of a second wavelength different from the first wavelength, and third light of a third wavelength different from the first wavelength and the second wavelength on different positions, respectively, on the optical axis to cancel chromatic aberration by the variable focus optical system, and
wherein the fixed-focus optical system comprises:
a first lens set configured to focus the first light on a first position on the optical axis, the first lens set comprising a first wavelength-selective polarization conversion element and a first anisotropic diffractive lens element;
a second lens set configured to focus the second light on a second position on the optical axis that is different from the first position, the second lens set comprising a second wavelength-selective polarization conversion element and a second anisotropic diffractive lens element; and
a third lens set configured to focus the third light on a third position on the optical axis that is different from the first position and the second position, the third lens set comprising a third wavelength-selective polarization conversion element and a third anisotropic diffractive lens element.

2. The focusing optical system of claim 1, wherein each of the fixed-focus optical system and the variable focus optical system has a positive refractive power.

3. The focusing optical system of claim 2, wherein a distance between the variable focus optical system and the first position is less than a distance between the variable focus optical system and the second position,
the distance between the variable focus optical system and the second position is less than a distance between the variable focus optical system and the third position, the third wavelength is longer than the second wavelength, and the second wavelength is longer than the first wavelength.

4. The focusing optical system of claim 2, wherein a distance between the variable focus optical system and the first lens set is less than a distance between the variable focus optical system and the second lens set, and the distance between the variable focus optical system and the second lens set is less than a distance between the variable focus optical system and the third lens set.

5. The focusing optical system of claim 2, wherein the variable focus optical system comprises a variable focus diffractive lens element having a first focal length for the first light, a second focal length for the second light, and a third focal length for the third light, the first focal length is longer than the second focal length, and the second focal length is longer than the third focal length.

6. The focusing optical system of claim 5, wherein the first position, the second position, and the third position are respectively selected to cancel chromatic aberration by the variable focus diffractive lens element to be within a focus adjustment range of the variable focus diffractive lens element.

7. The focusing optical system of claim 5, wherein a distance between the first position and the second position is equal to a difference between the first focal length and the second focal length, and a distance between the second position and the third position is equal to a difference between the second focal length and the third focal length.

8. The focusing optical system of claim 2, wherein the first wavelength-selective polarization conversion element, the first anisotropic diffractive lens element, the second wavelength-selective polarization conversion element, the second anisotropic diffractive lens element, the third wavelength-selective polarization conversion element, and the third anisotropic diffractive lens element are sequentially arranged along the optical axis.

9. The focusing optical system of claim 2, wherein the first wavelength-selective polarization conversion element is configured to polarize the first light to have a first linear polarization component and polarize the second light and the third light to have a second linear polarization component that is orthogonal to the first linear polarization component, the second wavelength-selective polarization conversion element is configured to polarize the second light to have the first linear polarization component and the first light and the third light to have the second linear polarization component, and the third wavelength-selective polarization conversion element is configured to polarize the third light to have the first linear polarization component and the first light and the second light to have the second linear polarization component.

10. The focusing optical system of claim 9, wherein each of the first anisotropic diffractive lens element, the second anisotropic diffractive lens element, and the third anisotropic diffractive lens element is configured to focus light of the first linear polarization component and transmit light of the second linear polarization component without diffraction.

11. The focusing optical system of claim 9, wherein the fixed-focus optical system further comprises a fourth wavelength-selective polarization conversion element configured to polarize the first light, the second light and the third light to have a same linear polarization component.

12. The focusing optical system of claim 2, wherein the first wavelength-selective polarization conversion element is configured to polarize the first light to have a first circular polarization component and to polarize the second light and the third light to have a second circular polarization component that is opposite to the first circular polarization component, the second wavelength-selective polarization conversion element is configured to polarize the second light to have the first circular polarization component and the first light and the third light to have the second circular polarization component, and the third wavelength-selective polarization conversion element is configured to polarize the third light to have the first circular polarization component and the first light and the second light to have the second circular polarization component.

13. The focusing optical system of claim 12, wherein each of the first anisotropic diffractive lens element, the second anisotropic diffractive lens element, and the third anisotropic diffractive lens element is configured to focus light of the first circular polarization component and transmit light of the second circular polarization component without diffraction.

14. The focusing optical system of claim 12, wherein the fixed-focus optical system further comprises a fourth wavelength-selective polarization conversion element configured to polarize the first light, the second light, and the third light to have a same circular polarization component.

15. The focusing optical system of claim 1, wherein the fixed-focus optical system has a positive refractive power and the variable focus optical system has a negative refractive power.

16. The focusing optical system of claim 15, wherein the fixed-focus optical system comprises a fixed-focus diffractive lens element having a first focal length for the first light, a second focal length for the second light, and a third focal length for the third light, the first focal length is longer than the second focal length, and the second focal length is longer than the third focal length.

17. The focusing optical system of claim 16, wherein the variable focus optical system comprises a variable focus diffractive lens element, chromatic aberration by the variable focus diffractive lens element is opposite to chromatic aberration by the fixed-focus diffractive lens element, and the chromatic aberration by the variable focus diffractive lens element is selected to cancel the chromatic aberration by the fixed-focus diffractive lens element in a focus adjustment range of the variable focus diffractive lens element.

18. A focusing optical system comprises:

a fixed-focus optical system having a fixed focal length on an optical axis; and a variable focus optical system having a first focal length for first light of an first wavelength, a second focal length for second light of an second wavelength different from the first wavelength, and a third focal length for third light of an third wavelength different from the first wavelength and the second wavelength, wherein the fixed-focus optical system comprises:

a first lens set configured to focus the first light on a first position on the optical axis, the first lens set comprising a first wavelength-selective polarization conversion element and a first anisotropic diffractive lens element;

a second lens set configured to focus the second light on a second position on the optical axis that is different from the first position, the second lens set comprising a second wavelength-selective polarization conversion element and a second anisotropic diffractive lens element; and a third lens set configured to focus the third light on a third position on the optical axis that is different from the first position and the second position, the third lens set comprising a third wavelength-selective polarization conversion element and a third anisotropic diffractive lens element, and wherein a distance between the first position and the second position is equal to a difference between the first focal length and the second focal length, and a distance between the second position and the third position is equal to a difference between the second focal length and the third focal length.

19. The focusing optical system of claim 18, wherein a distance between the first lens set and the variable focus optical system is less than a distance between the second lens set and the variable focus optical system, and a distance between the second lens set and the variable focus optical system is less than a distance between the third lens set and the variable focus optical system.

* * * * *